(12) United States Patent
Schmidt et al.

(10) Patent No.: US 6,256,991 B1
(45) Date of Patent: Jul. 10, 2001

(54) TURBOCHARGER SYSTEM FOR INTERNAL COMBUSTION ENGINE

(75) Inventors: Erwin Schmidt, Baltmannsweiler; Siegfried Sumser, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/446,526

(22) PCT Filed: Jun. 16, 1998

(86) PCT No.: PCT/EP98/03612

§ 371 Date: Dec. 27, 1999

§ 102(e) Date: Dec. 27, 1999

(87) PCT Pub. No.: WO99/00590

PCT Pub. Date: Jan. 7, 1999

(30) Foreign Application Priority Data

Jun. 26, 1997 (DE) .............................. 197 27 140

(51) Int. Cl.$^7$ .................................................. F02D 23/00
(52) U.S. Cl. .................. 60/602; 123/559.1; 415/164; 415/158
(58) Field of Search ................ 60/602; 123/559.1; 415/158, 164

(56) References Cited

U.S. PATENT DOCUMENTS

| | | | |
|---|---|---|---|
| 4,617,799 | * 10/1986 | Todokoro et al. | ........ 60/602 |
| 5,146,752 | * 9/1992 | Bruestle | ........ 60/602 |
| 5,839,281 | * 11/1998 | Sumser et al. | ........ 60/602 |

FOREIGN PATENT DOCUMENTS

| | | |
|---|---|---|
| 39 02 049 A1 | * 7/1990 | (DE) ............... 123/559.1 |
| 42 32 400 | 8/1993 | (DE) . |
| 43 30 487 | 1/1995 | (DE) . |
| 198 53 360 A1 | * 5/2000 | (DE) . |
| 63-289220 | 11/1988 | (JP) . |
| 1-104925 | 4/1989 | (JP) . |

* cited by examiner

Primary Examiner—Thomas Denion
Assistant Examiner—Thai-Ba Trieu
(74) Attorney, Agent, or Firm—Crowell & Moring, L.L.P.

(57) ABSTRACT

In a turbocharger system for internal combustion engines, the internal combustion engine has at least one combustion chamber with a variable volume and a swept volume determined by the sum of the differential volumes between the smallest and largest volumes of the combustion chambers of the internal combustion engine. The turbocharger system associated to the internal combustion engine has at least one turbine arranged in the exhaust gas pipe of the internal combustion engine and provided with a flow channel which opens via an annular jet-shaped region onto a turbine wheel. A guiding apparatus arranged in the opening region of the flow channel has a variable guiding grid with adjustable guiding blades which make it possible to obtain free flow sections of different sizes and which acts as a throttle during braking in an adjustable manner, depending on the operational parameters of the internal combustion engine, for determining the narrowest flow section in the exhaust gas pipe that leads to the turbine. The system is characterized in that at maximum braking power the relation between the free flow section A in the exhaust gas pipe that leads to the turbine, the inlet diameter D of the turbine wheel and the swept volume $V_H$ of the internal combustion engine is described by the equation (I) when the braking power supplied by the internal combustion engine during braking is at its maximum, the turbo-braking factor (TBF) being smaller than 0.0005 (5%). The internal combustion engine and the turbocharger are matched so as to supply maximum braking power with low thermal stress.

23 Claims, 3 Drawing Sheets

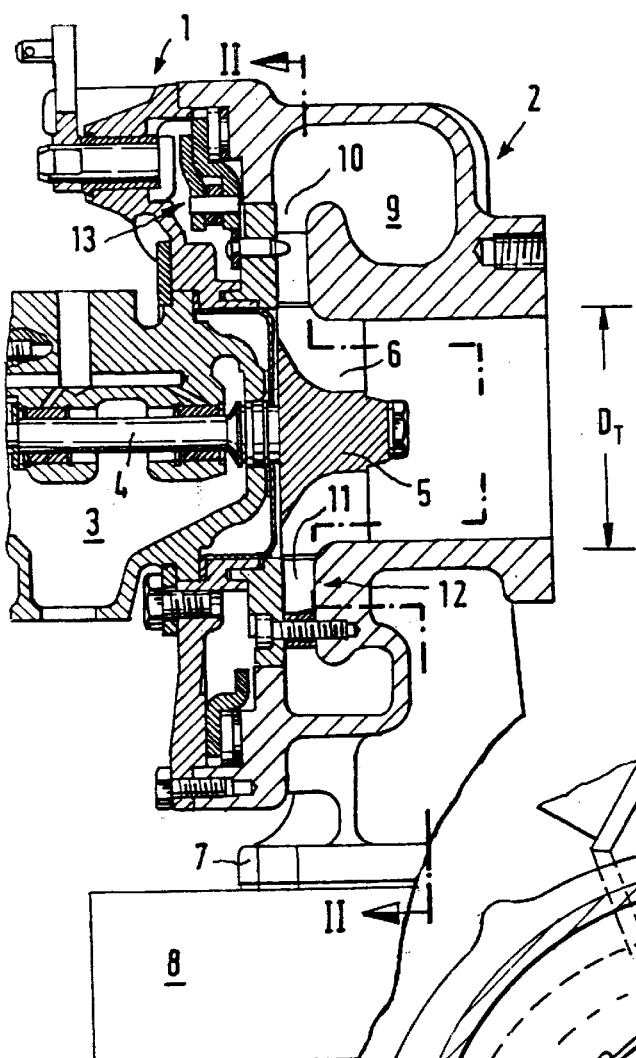
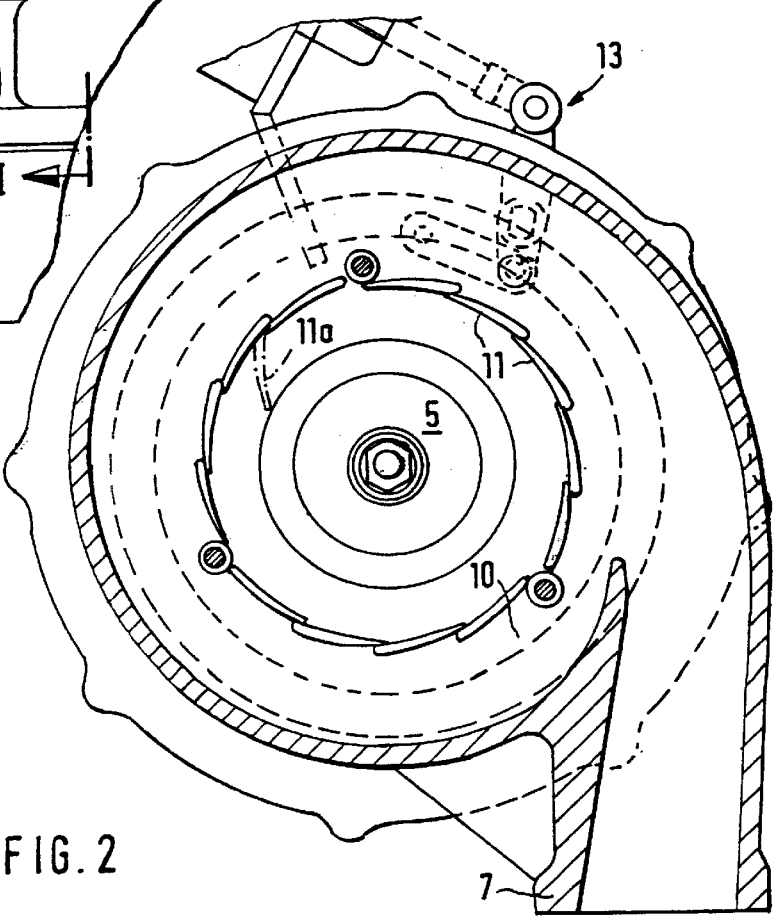
FIG.1
FIG.2

TURBOCHARGER SYSTEM FOR INTERNAL COMBUSTION ENGINE

BACKGROUND AND SUMMARY OF THE INVENTION

The invention relates to an internal combustion engine/turbocharger system.

An internal combustion engine/turbocharger system of this kind is known, for example, from German Patent document DE 4330487 C1. In this case, the guide vane array is arranged in the region in the form of an annular nozzle starting from the flow duct and opening onto the turbine rotor. The guide vane array comprises a variable guide vane array which is provided with adjustable guide vanes, allows free cross sections of flow of different sizes and can be used as a restrictor in a braking mode to determine the respective narrowest cross section of flow in the exhaust path to the turbine and to adjust it as a function of operating parameters of the internal combustion engine. With such a system it is possible to achieve high braking powers. However, there are problems in achieving these braking powers with low thermal loading on the internal combustion engine. It is therefore an aim of the invention to define a respectively suitable internal combustion engine/turbocharger system.

This aim is served by the invention, which is intended to provide internal combustion engine/turbocharger systems which will allow high braking powers for the braking mode with relatively low thermal loads on the internal combustion engine.

This is achieved in internal combustion engine/turbocharger systems by a design according to which the main parameters of the turbine are defined in such a way, in relation to the total displacement of the internal combustion engine, that maximum braking powers are made possible with comparatively low thermal loading of the internal combustion engine.

In this context, the following relation applies:

$$TBF = A_T \times \frac{D_T}{V_H},$$

where $A_T$ denotes the free cross section of flow exposed in the exhaust path to the turbine at maximum braking power, $D_T$ denotes the inlet diameter of the turbine rotor (in radial turbines, the geometric inlet diameter; in axial turbines, the mean diameter of flow of the design) and $V_H$ denotes the displacement of the internal combustion engine. TBF forms a turbo-braking factor, which, in the context of the invention, is less than 0.005 (5%) and is preferably 0.001 to 0.003 (1–3%).

Based on maximum braking power being the "design point", the free cross section of flow exposed in the exhaust path to the turbine at maximum braking power in the context of the invention is formed by (1) the cross section remaining as a residual cross section flow when the guide vane array is closed, covering a lower engine-speed range, and (2) a variable cross-sectional component, which is larger than that for the design point. The ratio of the additional, variable cross section of flow (which increases towards the maximum braking power) to the residual cross section of flow (remaining when the guide vane array is closed) is greater than 0.2 for the design point, namely maximum braking power, and preferably is in the range between 0.2 and 1.

With a small ratio, the braking power in the lower engine-speed range is relatively low and rises relatively steeply in the upper engine-speed range. With a large ratio, a higher braking power is obtained in the lower engine-speed range, with a less steep rise in the braking power towards the point of maximum braking power as the design point, in comparison with smaller ratios. Based on the engine-speed band, the upper speed range, in which an additional, variable cross section flow is exposed, begins at about ⅔ to ¾ of the speed at maximum braking power. The speed at maximum braking power lies within a range which is about ¼ to ⅓ times greater than the rated speed of the internal combustion engine, i.e. the speed at the maximum power of the internal combustion engine.

BRIEF DESCRIPTION OF THE DRAWINGS

Further details and features of the invention will become apparent from the claims. The invention is furthermore explained in greater detail below with reference to drawings, in which:

FIG. 1 is a section through the turbine side of a turbocharger;

FIG. 2 is a section along the line II—II in FIG. 1, showing in particular the guide vane system of the turbine, said guide vane system being provided with adjustable guide vanes;

DETAILED DESCRIPTION OF THE DRAWINGS

Figure 3:
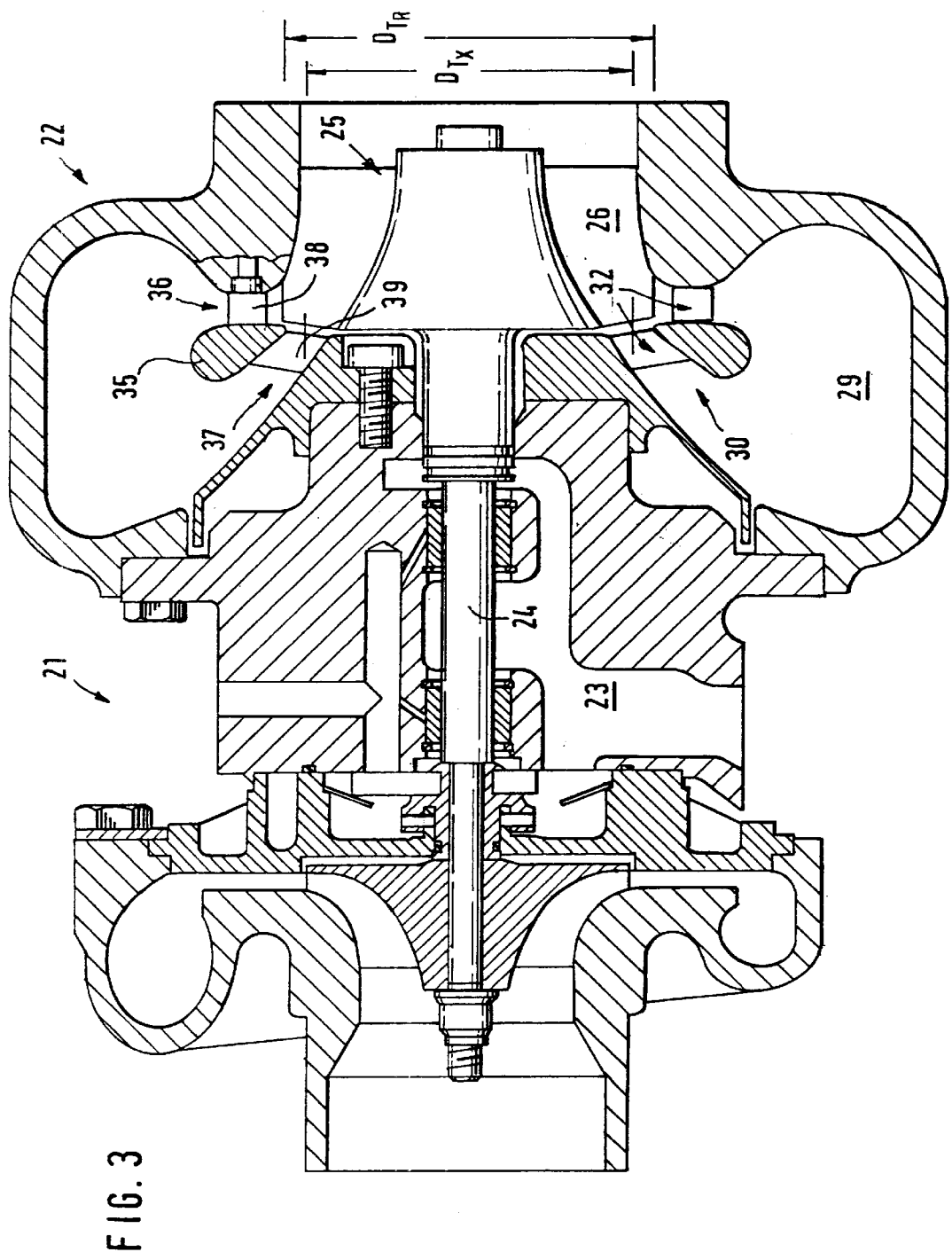
FIG. 3 is a section corresponding essentially to FIG. 1 through a turbocharger with a two-part guide vane system associated with the turbine.

In the schematic diagram of FIGS. 1 and 2, 1 denotes the turbocharger overall, although of this only the turbine 2 and part of the drive line 3 connecting the turbine 2 to the compressor component (not shown) are shown. The turbine rotor 5 with its turbine blades 6, to which exhaust gas is admitted radially, is seated on the connecting shaft 4.

Via the flange 7, the turbine 2 is connected to the internal combustion engine 8 (indicated only schematically here), from which the exhaust gas is led to the flow duct 9 of the turbine. The exhaust gas flows out of the duct 9 onto the turbine rotor blades 6 via a radially extending annular nozzle 10. As can be seen in conjunction with FIG. 2, the nozzle duct of the annular nozzle 10 contains the adjustable guide vanes 11 of a guide vane system 12. The adjusting mechanism for the blades 11 is indicated in FIG. 1 by 13, although no further explanation is given here. As can be seen from FIG. 2, the adjusting mechanism 13 can be used to pivot the guide vanes 11 out of the closed position, in which they overlap one another in series in the circumferential direction and substantially cover the cross section of the annular nozzle 10, into an open position, as indicated for vane 11a, in which they are virtually tangential to the circle enclosing the turbine blades 6.

If the guide vanes 11 are in their closed position as shown in FIG. 2, the cross section of the annular nozzle 10 is virtually closed, but for any gaps, and the residual cross section of flow remaining in the region of the annular nozzle 10 at the transition from the flow duct 9 to the turbine 2 is very small.

FIG. 3 shows another embodiment of a turbocharger, this being denoted overall by 21 and comprising a turbine 22, between which and a compressor component lying opposite, there is a drive line 23 comprising a shaft 24 on which the turbine rotor 25 is arranged coaxially with the compressor impeller lying opposite. As already explained with reference to FIGS. 1 and 2 and not illustrated further here, the turbocharger 21 is connected to an internal combustion engine and is supplied with the exhaust gases from the latter, which are fed via flow paths (not shown specifically here) from the internal combustion engine to the flow duct 29. The flow duct 29 is connected via a region 30 in the form of an annular nozzle to the space accommodating the turbine rotor 25. The blades of the rotor 25 are denoted by 26. The annular nozzle, which is denoted overall by 30, which, in the case of the turbocharger shown in FIG. 3, is divided by an annular body 35 into a radial duct component 36 and a semi-axial duct component 37, accommodates in both duct components a guide vane system 32. This system 32 comprising a guide vane array 38 with adjustable guide vanes in duct component 36 and a guide vane array 39 with fixed guide vanes in duct component 37.

The flow cross section of guide vane array 39 is invariable, while the flow cross section of guide vane array 38 can be varied as a function of the position of the associated guide vanes (not shown in detail here). The guide vanes of guide vane array 38 are arranged and are adjustable in a known manner, for example in a manner similar to that shown in FIG. 2.

The inlet diameters for the exhaust gas at the transition from guide vane systems 12 and 32 to turbine rotors 5 and 25 differ in accordance with the differences in the design of the guide vane systems 12 and 32 in FIGS. 1 and 2 and FIG. 3, respectively. In the illustrative embodiment shown in FIGS. 1 and 2, the corresponding inlet diameter corresponds essentially to the circumcircle of the turbine rotor blades 6 of the turbine rotor 5 and is denoted by $D_T$.

In the illustrative embodiment shown in FIG. 3, the annular nozzle 30 is divided and comprises a radial duct component 36 and a semi-axial duct component 37, which open onto the blades 26 of the turbine rotor at different diameters. In this context, the inlet diameter as regards the radial duct component again corresponds approximately to the circumcircle of the turbine rotor blades 26 in the region lying opposite this duct component 36 and is denoted by $D_{T_R}$. The inlet diameter of the semi-axial duct component 37 is smaller since this duct component coincides with the turbine rotor blades 26 over an annular cross section which lies radially within the circumcircle. The mean annular diameter of this annular cross section should be regarded essentially as the inlet diameter of this semi-axial duct component 37 and, in FIG. 3, is denoted by $D_{T_X}$. The flow cross section exposed at maximum braking power is denoted by $A_T$. It is made up of a residual flow cross section remaining when the guide vanes of guide vane array 38 are closed and, for this guide vane array 38, corresponds approximately to the remaining gap cross sections. At maximum braking power, a variable flow cross section is added to that of guide vane array 39, the flow cross section of which is invariable, i.e. which is open in all operating phases.

In the case of an undivided annular nozzle 10 (FIGS. 1 and 2), the quantity of gas flowing in via cross section $A_T$ acts on the turbine rotor at a diameter corresponding overall to the inlet diameter $D_T$ of the turbine rotor.

In the illustrative example shown in FIG. 3, corresponding free components of the flow cross section are obtained in the exhaust path to the turbine, both for the radial duct component 36 and for the semi-axial duct component 37. Here, the latter is invariable since the guide vane array 39 of this duct component is provided with fixed guide vanes. The flow cross section of the radial duct component is variable since the guide vane array 38 is provided with adjustable guide vanes. When these guide vanes are closed, the free residual cross section of flow remaining for this guide vane array 38 is virtually determined by the gap dimensions, as shown in FIGS. 1 and 2.

In accordance with the differences in the free cross sections of flow, different gas flow rates are obtained, these behaving analogously to the cross sections.

If, as already indicated, the free cross section of flow in the exhaust path to the turbine at maximum braking power is denoted by $A_T$, this cross section is made up of a radial cross-sectional component $A_{T_R}$ and a semi-axial cross-sectional component $A_{T_X}$ in the case of a two-part annular nozzle 30 with a radial duct component 36 and a semi-axial duct component 37, as shown below:

$$A_T = A_{T_X} + A_{T_R}.$$

An inlet diameter of the turbine rotor $D_T$ which takes account of the differences in the flow rates in duct components 36 and 37 by weighting them can be calculated as follows:

$$D_T = \frac{A_{T_X}}{A_T} \times D_{T_X} + \frac{A_{T_R}}{A_T} \times D_{T_R}$$

Taking into account the statements made above, the following equation applies to an internal combustion engine/turbocharger system in which high braking powers are associated with low thermal loads in the braking mode:

$$TBF = A_T \times \frac{D_T}{V_H},$$

where the turbo-braking factor TBF is less than 0.005, preferably between 0.001 and 0.003, and is, in particular, 0.002, and $V_H$ is the displacement of the internal combustion engine.

Based on a turbine with a guide vane array having adjustable guide vanes, in which an additional variable cross-sectional component over and above the residual cross section of flow is exposed at maximum braking power by (partially) opening the guide vanes, the following equation applies to the free cross section exposed in the exhaust path to the turbine at maximum braking power:

$$A_T = A_D + dA_{V,max},$$

where $A_D$ is the residual cross section of flow remaining when the guide vane array is closed and $dA_{V,max}$ is the additional cross section of flow exposed by the guide vane array at maximum braking power.

The ratio VF of $dA_{V,max}$ to $A_D$ is preferably greater than 0.2 and is, in particular, in a range between 0.2 and 1, the selected magnitude of this ratio denoted by VF being higher, the higher the braking power is supposed to be at low engine speeds.

Figure 4:
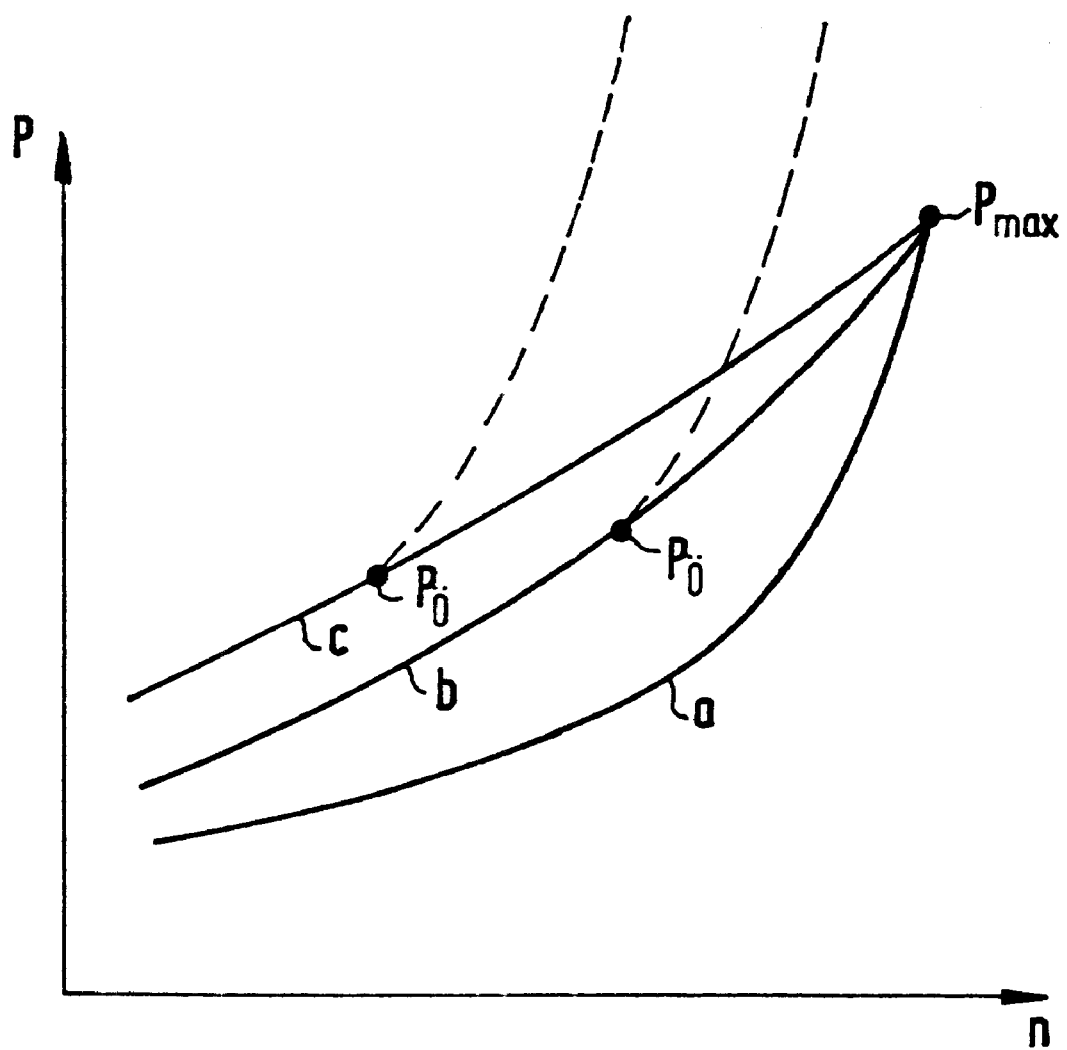
FIG. 4 is a schematic elementary diagram showing the fundamental variation of the braking power against engine speed for different ratios of a variable cross section of flow additionally exposed at maximum braking power to a residual cross section of flow available with the guide vane array closed.

FIG. 4 illustrates this in a schematic diagram in which the braking power P is plotted against the engine speed n. The curve "a" describes the situation as regards an internal combustion engine/turbocharger system in which the guide vane array has a constant cross section over the entire engine speed range and the ratio of $A_{V,max}$ to $A_D$ is therefore 0. Curve trace "b" intersects curve trace a at the design point $P_{max}$ for maximum braking power but lies above curve trace a and illustrates an engine design in which the braking power is higher in the low engine-speed range and which, therefore, based on an analogous engine configuration and the same quantities of exhaust gas, must have a cross section of flow in the exhaust path to the turbine which is smaller in the low engine-speed range. This nozzle design with a smaller cross section of flow in the low engine-speed range corresponds to a variable increase in the free cross section of flow in the upper engine-speed range since otherwise the maximum braking power would be reached at a low engine-speed level. The start of the opening of the guide vanes is indicated at $P_Ö$; without adding the variable component of the cross section, the curve shown in dashes would be obtained, starting from $P_Ö$.

Curve trace c represents another variant with an even higher braking power in the low engine-speed range and, assuming the same basic design of the engine, the variable component of the cross section of flow must be greater in the upper engine-speed range than in case b if the maximum braking power $P_{max}$ is to be achieved at the same engine speed. Here too, as with curve trace b, the cut-in point for the variable component is denoted by $P_Ö$.

The addition of the variable cross section of flow thus preferably takes place at lower engine speeds as the variable component of the total opening cross section or the higher braking power in the low engine-speed range increases, in order to ensure a uniform increase in braking power against engine speed.

With regard to the internal combustion engine/turbocharger system, the maximum braking power is expediently achieved in an engine-speed range above the rated engine-speed range, i.e. the speed of the engine at maximum power. If the rated speed is 1800 rpm, the engine speed at maximum braking power can, for example, be in the region of 2300 revolutions per minute. The upper engine-speed range, in which an additional, variable cross section of flow is exposed, expediently begins at about ⅔ to ¾ of the engine speed at maximum braking power. The size of the variable component of the cross section preferably increases continuously as a function of the engine speed until the maximum braking power is reached. The maximum braking power forms the reference point for the above-explained configuration of the system for maximum braking power with minimum thermal loading.

The explanation of the guide vane system explained above with a variable guide vane array referenced embodiments of the guide vane array in which the guide vanes can be adjusted within the guide vane array, but the guide vane array overall maintains its position.

There are also known guide vane arrays in which the guide vanes are not adjustable within the guide vane array but the guide vane array as a whole is adjustable, allowing differently arranged and/or designed guide vanes associated with mutually offset regions of the guide vane array to be brought into use in a braking mode by adjusting the guide vane array (by adjusting the guide vane array axially in accordance with German Patent document DE 42 32 400 C1 for example), thus enabling different free cross sections of flow corresponding to the differently arranged and/or designed guide vanes to be achieved for the braking mode in the sense of the invention by adjusting the guide vane array.

The invention is of interest particularly for internal combustion engine/turbocharger systems used in commercial vehicles, i.e. vehicles which depend on high engine braking powers even for the braking mode and which are fitted with engines of relatively large volume.

However, the invention could also become significant in connection with engines of small volume and light vehicles, e.g. passenger vehicles, even if the engines used there can, per se only produce low braking powers due, for example, to the gas-exchange control systems used there.

To complement the guide vane array that can be adjusted for the braking mode, it may be expedient, as a refinement of the invention, to provide a blow-off valve as known per se, whether as an emergency valve for the purpose of limiting the pressure or as a restrictor element which likewise has a variable opening cross section, complementing the adjustable guide vane array. The valve is opened, preferably gradually in the upper engine speed range towards the point of maximum braking power for example, if there are difficulties in achieving the required variable cross-sectional component solely and/or within the required time period by adjusting the guide vane system for example.

What is claimed is:

1. An internal combustion engine/turbocharger system, comprising:

an internal combustion engine having at least one variable-volume combustion chamber, an engine displacement of the internal combustion engine being determined by a sum of the differences between the smallest and the largest volume of combustion chambers of the engine;

a turbocharger system operatively coupled with the internal combustion engine, said turbocharger system having at least one turbine including a turbine rotor, said turbine being arranged in an exhaust path of the engine and having a flow duct opening via an annular nozzle region onto the turbine rotor;

a guide vane system arranged in said region, said guide vane system comprising a variable guide vane array having adjustable guide vanes, said variable guide vane array allowing free cross sections of flow of different magnitude, said guide vane array further determining, in a braking mode, a respective narrowest cross section of flow in the exhaust path to the turbine and adjusting it as a function of engine operating parameters using the guide vane array as a restrictor;

wherein, based on braking operation at a maximum braking power of the engine, a free cross section of flow $A_T$ exposed in the exhaust path to the turbine at the maximum braking power, an inlet diameter $D_T$ of the turbine rotor, and a displacement $V_H$ of the engine have the following relationship:

$$TBF = A_T \times \frac{D_T}{V_H},$$

in which TBF denotes a turbo-braking factor and is less than 0.005 (5%).

2. The internal combustion engine/turbocharger system according to claim 1, wherein the turbo-braking factor TBF is between 0.001 and 0.003.

3. The internal combustion engine/turbocharger system according to claim 2, wherein the turbo-braking factor TBF is 0.002 (2%).

4. The internal combustion engine/turbocharger system according to claim 3, wherein for the guide vane array with adjustable guide vanes, the following equation applies for the free cross section of flow $A_T$ exposed in the exhaust path to the turbine at maximum braking power:

$$A_T = A_D + dA_{V,max},$$

where
- $A_D$ is the residual cross section of flow remaining when the guide vane array is closed; and
- $dA_{V,max}$ is an additional cross section of flow exposed by the guide vane array at maximum braking power.

5. The internal combustion engine/turbocharger system according to claim 2, wherein for the guide vane array with adjustable guide vanes, the following equation applies for the free cross section of flow $A_T$ exposed in the exhaust path to the turbine at maximum braking power:

$$A_T = A_D + dA_{V,max},$$

where
- $A_D$ is the residual cross section of flow remaining when the guide vane array is closed; and
- $dA_{V,max}$ is an additional cross section of flow exposed by the guide vane array at maximum braking power.

6. The internal combustion engine/turbocharger system according to claim 1, wherein for the guide vane array with adjustable guide vanes, the following equation applies for the free cross section of flow $A_T$ exposed in the exhaust path to the turbine at maximum braking power:

$$A_T = A_D + dA_{V,max},$$

where
- $A_D$ is the residual cross section of flow remaining when the guide vane array is closed; and
- $dA_{V,max}$ is an additional cross section of flow exposed by the guide vane array at maximum braking power.

7. The internal combustion engine/turbocharger system according to claim 6, wherein the following equation applies for a ratio VF of the residual cross section of flow $A_D$ remaining when the guide vane array is closed to the additional cross section of flow $dA_{V,max}$ of the guide vane array exposed at maximum braking power:

$$VF = \frac{dA_{V,max}}{A_D} > 0.2.$$

8. The internal combustion engine/turbocharger system according to claim 7, wherein the additional cross section of flow $dA_{V,max}$ of the guide vane array exposed at maximum braking power is the upper limiting value which the variable cross section of flow $dA_V$ assumes within its adjustment range.

9. The internal combustion engine/turbocharger system according to claim 8, wherein the variable cross section of flow $dA_V$ is varied as a function of the engine speed.

10. The internal combustion engine/turbocharger system according to claim 9, wherein the variable cross section of flow $dA_V$ becomes smaller as the engine speed decreases.

11. The internal combustion engine/turbocharger system according to claim 10, wherein an adjustment range of the variable cross section of flow $dA_V$ is associated with the upper range of an engine-speed band which extends as far as the engine speed corresponding to maximum braking power.

12. The internal combustion engine/turbocharger system according to claim 9, wherein an adjustment range of the variable cross section of flow $dA_V$ is associated with the upper range of an engine-speed band which extends as far as the engine speed corresponding to maximum braking power.

13. The internal combustion engine/turbocharger system according to claim 8, wherein an adjustment range of the variable cross section of flow $dA_V$ is associated with the upper range of an engine-speed band which extends as far as the engine speed corresponding to maximum braking power.

14. The internal combustion engine/turbocharger system according to claim 13, wherein the maximum braking power occurs at an engine speed above the rated speed of the internal combustion engine.

15. The internal combustion engine/turbocharger system according to claim 14, wherein the upper engine-speed range in which an additional, variable cross section of flow $dA_V$ is exposed starts at about ⅔ to ¾ of the engine speed at maximum braking power.

16. The internal combustion engine/turbocharger system according to claim 13, wherein the upper engine-speed range in which an additional, variable cross section of flow $dA_V$ is exposed starts at about ⅔ to ¾ of the engine speed at maximum braking power.

17. The internal combustion engine/turbocharger system according to claim 13, wherein the maximum braking power occurs at an engine speed which is about ¼ to ⅓ times higher than the rated speed at the rated power of the internal combustion engine.

18. The internal combustion engine/turbocharger system according to claim 7, wherein the maximum braking power occurs at an engine speed which is about ¼ to ⅓ times higher than the rated speed at the rated power of the internal combustion engine.

19. The internal combustion engine/turbocharger system according to claim 6, wherein the maximum braking power occurs at an engine speed which is about ¼ to ⅓ times higher than the rated speed at the rated power of the internal combustion engine.

20. The internal combustion engine/turbocharger system according to claim 1, wherein the maximum braking power occurs at an engine speed which is about ¼ to ⅓ times higher than the rated speed at the rated power of the internal combustion engine.

21. A method of operating an internal combustion/turbocharger system in which a variable guide vane array having adjustable guide vanes is provided in an inlet region to a turbine rotor, the method comprising the acts of:
- adjusting the cross section of flow in the inlet region using the variable guide vane array; and
- based on a braking operating at a maximum braking power of the engine, maintaining a turbo-braking factor (TBF), less than 0.005, wherein the turbo-braking factor is determined by the following relationship:

$$TBF = A_T \times \frac{D_T}{V_H},$$

wherein $A_T$ is a free cross section of flow exposed in an exhaust path to the turbine at maximum braking power, $D_T$ is an inlet diameter of the turbine rotor, and $V_H$ is a displacement of the engine.

22. The method according to claim 21, wherein the method maintains the turbo-braking factor to be between 0.001 and 0.003.

23. The method according to claim 21, wherein the method maintains the turbo-braking factor to be approximately 0.0002.

* * * * *